US008107077B2

(12) United States Patent
Tamada

(10) Patent No.: US 8,107,077 B2
(45) Date of Patent: Jan. 31, 2012

(54) TERAHERTZ SPECTROSCOPIC APPARATUS

(75) Inventor: Sakuya Tamada, Tokyo (JP)

(73) Assignee: Sony Corporation, Tokyo (JP)

( * ) Notice: Subject to any disclaimer, the term of this patent is extended or adjusted under 35 U.S.C. 154(b) by 325 days.

(21) Appl. No.: 12/476,680

(22) Filed: Jun. 2, 2009

(65) Prior Publication Data
US 2009/0303480 A1 Dec. 10, 2009

(30) Foreign Application Priority Data
Jun. 10, 2008 (JP) .............................. P2008-152046

(51) Int. Cl.
*G01J 4/00* (2006.01)
(52) U.S. Cl. ....................................... 356/369
(58) Field of Classification Search .................. None
See application file for complete search history.

(56) References Cited

U.S. PATENT DOCUMENTS

| 6,111,416 | A  | * | 8/2000 | Zhang et al. | 324/244.1 |
| 2002/0067480 | A1 | * | 6/2002 | Takahashi | 356/317 |
| 2003/0016358 | A1 | * | 1/2003 | Nagashima et al. | 356/364 |
| 2006/0231762 | A1 | * | 10/2006 | Ohtake et al. | 250/341.8 |
| 2007/0195921 | A1 | * | 8/2007 | Ouchi | 378/1 |
| 2007/0252992 | A1 | * | 11/2007 | Itsuji | 356/369 |
| 2008/0006767 | A1 |   | 1/2008 | Taday et al. | |
| 2009/0101297 | A1 | * | 4/2009 | Jez et al. | 356/429 |
| 2009/0302223 | A1 |   | 12/2009 | Tamada et al. | |

FOREIGN PATENT DOCUMENTS

| JP | 2003-014620 |   | 1/2003 |
| JP | 2006-266908 | A | 10/2006 |
| JP | 2007-101370 | A | 4/2007 |
| JP | 2008-510980 | A | 4/2008 |

* cited by examiner

*Primary Examiner* — Gregory J Toatley
*Assistant Examiner* — Juan D Valentin
(74) *Attorney, Agent, or Firm* — Wolf, Greenfield & Sacks, P.C.

(57) ABSTRACT

A terahertz spectroscopic apparatus includes a polarization beam splitter transmitting or reflecting a linearly polarized terahertz wave, a quarter wave plate imparting a phase difference of 90° to a terahertz wave impinging thereon, and an optical member guiding a circularly polarized terahertz wave impinging thereon from the polarization beam splitter via the quarter wave plate to an irradiation surface.

8 Claims, 5 Drawing Sheets

CONFIGURATION OF TERAHERTZ WAVE PROPAGATING OPTICAL SYSTEM

CONFIGURATION OF TERAHERTZ WAVE PROPAGATING OPTICAL SYSTEM

RELATIONSHIP BETWEEN PHASE DIFFERENCE BETWEEN P-POLARIZED LIGHT
AND S-POLARIZED LIGHT AND ANGLE OF INCIDENCE ON TOTAL REFLECTION PRISM

CONFIGURATION (1) OF TERAHERTZ WAVE PROPAGATING OPTICAL
SYSTEM IN ANOTHER EMBODIMENT

CONFIGURATION (2) OF TERAHERTZ WAVE PROPAGATING OPTICAL SYSTEM IN STILL ANOTHER EMBODIMENT

TERAHERTZ SPECTROSCOPIC APPARATUS

BACKGROUND OF THE INVENTION

1. Field of the Invention

The present invention relates to a technique utilizing an electromagnetic wave of a band in the range from about $0.1 \times 10^{12}$ Hz to about $100 \times 10^{12}$ Hz (a terahertz wave).

2. Description of the Related Art

Terahertz wave spectroscopic techniques in the related art include terahertz time-domain spectroscopy (THz-TDS). It is known that terahertz time-domain spectroscopy is suitable for imaging of samples, and the technique attracting attentions in various technical fields such as industrial, medical, biological, agricultural, and security-related techniques.

In terahertz time-domain spectroscopy, pulse light from an ultra-short laser light source is separated into pumping light and probe light, and the pumping light is collected by a terahertz wave generating section. As a result, a current on the order of sub-pico seconds is generated or electrical polarization occurs at the terahertz wave generating section, and a terahertz wave having an electric field amplitude in proportion to a time-differential of the current is generated. The terahertz wave travels via an optical system to a sample to be measured be transmitted or reflected by the sample, and the wave is collected by a terahertz wave detecting section. When the terahertz wave detecting section is irradiated by the probe light at this time, a carrier is generated, and the carrier is accelerated by the electric field of the terahertz wave to generate a current that is an electric signal in the form of pulses. A temporal waveform of the electric field of the terahertz wave amplitude can be measured by shifting the timing at which the probe light arrives at the terahertz wave detecting section. The temporal waveform can be Fourier-transformed to obtain a transmission or reflection spectrum of the terahertz wave band.

An apparatus utilizing the terahertz time-domain spectroscopy has been proposed as follows. Among terahertz electromagnetic waves 20 guided from a radiation antenna 3 via a semi-spherical lens 43 and a parabolic mirror 4, only a particular polarized electromagnetic wave is transmitted through a polarizer 30 that is a wire grid, and the wave is thereafter made to impinge on a sample 5 obliquely. A terahertz electromagnetic wave 21 obtained as a result of reflection at the sample 5 is guided to a reception antenna 7 via a detector 31 that is a wire grid similar to the polarizer 30 (see Japanese Patent No. 3550381 (Patent Document 1)).

SUMMARY OF THE INVENTION

In the above-described apparatus, since a linearly polarized terahertz wave is guided to the sample 5 via the polarizer 30, when the sample 5 has certain orientation characteristics as seen in, for example, a fiber-like structure, the reflectance of the linearly polarized light at the sample 5 varies significantly depending on the polarization direction of the same. Further, a terahertz wave cannot be visually perceived, and the orientation characteristics of the sample 5 are unknown in general. It is therefore difficult to dispose the sample 5 in consideration to the relationship between the polarization direction of the linearly polarized light and the orientation characteristics of the sample 5.

Therefore, in such an apparatus, the reflectance of the linearly polarized light at the sample 5 varies depending on the relationship between the polarization direction of the light and the orientation characteristics of the sample 5, which has been problematic in that the variation can be reflected in results of measurement.

The invention addresses the above-identified and other problems and, according to an embodiment of the invention, there is proposed a terahertz spectroscopic apparatus which allows the accuracy of measurement of a sample to be improved regardless of orientation characteristics of the sample.

According to an embodiment of the invention, there is provided a terahertz spectroscopic apparatus including a polarization beam splitter transmitting or reflecting a linearly polarized terahertz wave, a quarter wave plate imparting a phase difference of 90° to a terahertz wave impinging thereon, and an optical member guiding a circularly polarized terahertz wave impinging thereon from the polarization beam splitter through the quarter wave plate to an irradiation surface.

According to the embodiment of the invention, even when a sample having certain orientation characteristics such as those seen in a fiber-like structure is disposed on the irradiation surface, since a circularly polarized terahertz wave is guided to the irradiation surface, the reflectance of the terahertz wave at the sample can be made similar to that observed on a sample without orientation characteristics. That is, variation of reflectance at a sample can be suppressed regardless of the state of orientation of the sample to achieve improved reproducibility of measurement. Thus, a terahertz spectroscopic apparatus allowing measurement with improved accuracy can be provided.

DETAILED DESCRIPTION OF THE INVENTION

An embodiment of the invention will now be described with reference to the drawings.

(1) General Configuration of Terahertz Spectroscopic Apparatus

Figure 1:
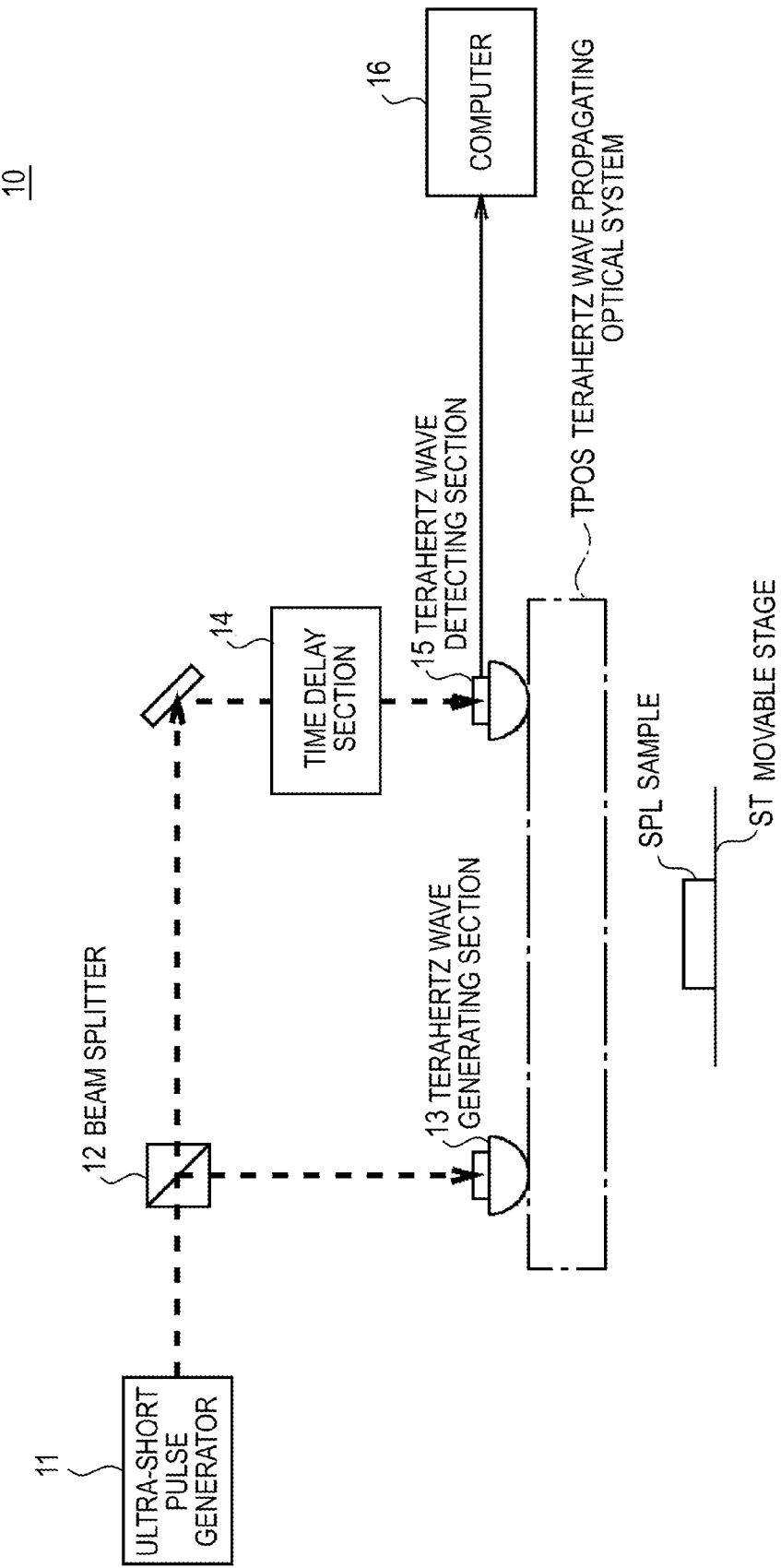
FIG. 1 is a schematic illustration showing a general configuration of a terahertz spectroscopic apparatus according to an embodiment of the invention.

FIG. 1 shows a general configuration of a terahertz spectroscopic apparatus 10 according to the present embodiment. The terahertz spectroscopic apparatus 10 includes an ultra-short pulse oscillator 11, a polarization beam splitter 12, a terahertz wave generating section 13, a time delay section 14, a terahertz wave detecting section 15, and a computer 16.

For example, the ultra-short pulse oscillator 11 emits pulse light having a pulse width of about 60 fs, a repetition period of about 100 MHz, and a center wavelength of about 800 nm. Specifically, a femtosecond titanium sapphire pulse laser or a femtosecond fiber laser is used as the ultra-short pulse oscillator 11.

The beam splitter 12 separates the pulse light emitted from the ultra-short pulse oscillator 11 into pumping light and probe light. The pumping light travels through a predetermined optical system to be collected by the terahertz wave generating section 13. The probe light travels through the time delay section 14 and a predetermined optical system to be guided to the terahertz wave detecting section 15.

The terahertz wave generating section 13 is triggered by the pumping light for generation of a terahertz wave having an electric field amplitude. Specifically, the terahertz wave generating section 13 may be a photo-conductive antenna including a semiconductor substrate made of a semi-insulating GaAs, a pair of electrodes formed on the semiconductor substrate, and an application section for applying a bias voltage to the electrodes. Alternatively, an electro-optical crystal such as ZnTe used for generating a terahertz wave based on difference frequency mixing may be used.

The terahertz wave generated by the terahertz wave generating section 13 is guided to a sample SPL disposed on a movable stage ST via a terahertz wave propagating optical system TPOS. After undergoing reflections (including scattering) at the sample SPL, the terahertz wave is collected by the terahertz wave detecting section 15 via the terahertz wave propagating optical system TPOS.

The time delay section 14 delays the time of arrival of the probe light at the terahertz wave detecting section 15 (the timing of excitation of the terahertz wave detecting section 15) by changing the optical path length between the polarization beam splitter 12 and the terahertz wave detecting section 15. Specifically, the time delay section 14 may have a configuration in which a stage having a mirror such as a retroreflector or roof mirror disposed thereon is operated at a predetermined speed in the direction of moving toward or away from a rectangular prism.

The terahertz wave detecting section 15 detects the terahertz wave which is guided thereto via the terahertz wave propagating optical system TPOS after being reflected by the sample SPL. Specifically, the terahertz wave detecting section 15 generates an electric field according to the terahertz wave guided thereto via the terahertz wave propagating optical system TPOS and samples a waveform of the oscillating electric field of the terahertz wave at the timing of arrival of the probe light which has been delayed by the time delay section 14. Specific examples of the terahertz wave detecting section 15 include a photoconductive antenna and an electro-optical crystal such as ZnTe which are similar to those usable as the terahertz wave generating section 13.

The computer 16 acquires a waveform of the oscillating electric field of a terahertz wave measured by the terahertz wave detecting section 15 when an object to be measured is disposed on a mounting surface as the sample SPL (hereinafter, the waveform may be also referred to as "first terahertz waveform"). The computer also acquires a waveform of the oscillating electric field of a terahertz wave measured by the terahertz wave detecting section 15 when an object to be used as a reference for measurement (e.g., a metal mirror or a silicon substrate) is disposed on the mounting surface as the sample SPL (the waveform may be hereinafter also referred to as "second terahertz waveform" or "second detection signal"). Alternatively, the second detection signal may be stored in a storage section of the computer 16 in advance and may be acquired from the storage section.

When the first terahertz waveform and the second terahertz waveform are acquired, the computer 16 performs a Fourier transform of the two terahertz waveforms to acquire a reflection spectrum in the terahertz band that is determined to be wider from the ratio between spectra obtained as a result of the transform. Based on the reflection spectrum, the computer 16 calculates a complex dielectric constant or optical constant of the object to be measured to generate information concerning the components, density, or state (shape) of the object to be measured from the result of the calculation.

Since the terahertz spectroscopic apparatus 10 employs terahertz time domain spectroscopy as thus described, when compared to Fourier spectroscopy employing infrared light, the apparatus has a higher signal-to-noise ratio in the frequency band and can acquire amplitude information and phase information at the same time. As a result, information concerning an object to be measured can be acquired with high accuracy.

(2) Configuration of Terahertz Wave Propagating Optical System

A configuration of the terahertz wave propagating optical system TPOS in the present embodiment will now be described with reference to FIG. 2. The terahertz wave propagating optical system TPOS is formed by optical members, i.e., three parabolic mirrors 21, 22, and 23, a polarization beam splitter 31, and a Fresnel-Rohm prism 32.

The parabolic mirror 21 guides a terahertz wave radially generated by the terahertz wave generating section 13 to the polarization beam splitter 31 as a bundle of parallel beams.

The polarization beam splitter 31 is a polarizer in the form of a sheet on which metal wires are arranged in the same direction at predetermined intervals, and the splitter is tilted at 45° to the optical axis of the terahertz wave impinging thereon from the parabolic mirror 21. Thus, the polarization beam splitter 31 serves as a polarization beam splitter which transmits particular polarized components, i.e., P-polarized components (in a polarization direction that is parallel to the plane of FIG. 2) of the terahertz wave impinging from the parabolic mirror 21.

The Fresnel-Rohm prism 32 performs phase conversion utilizing total reflection that occurs four times, and the prism is molded from a plastic (organic polymer) such as polyethylene, Teflon (a registered trademark), polymethylpentene, cyclo-olefin polymer, or cyclo-olefin copolymer.

Figure 2:
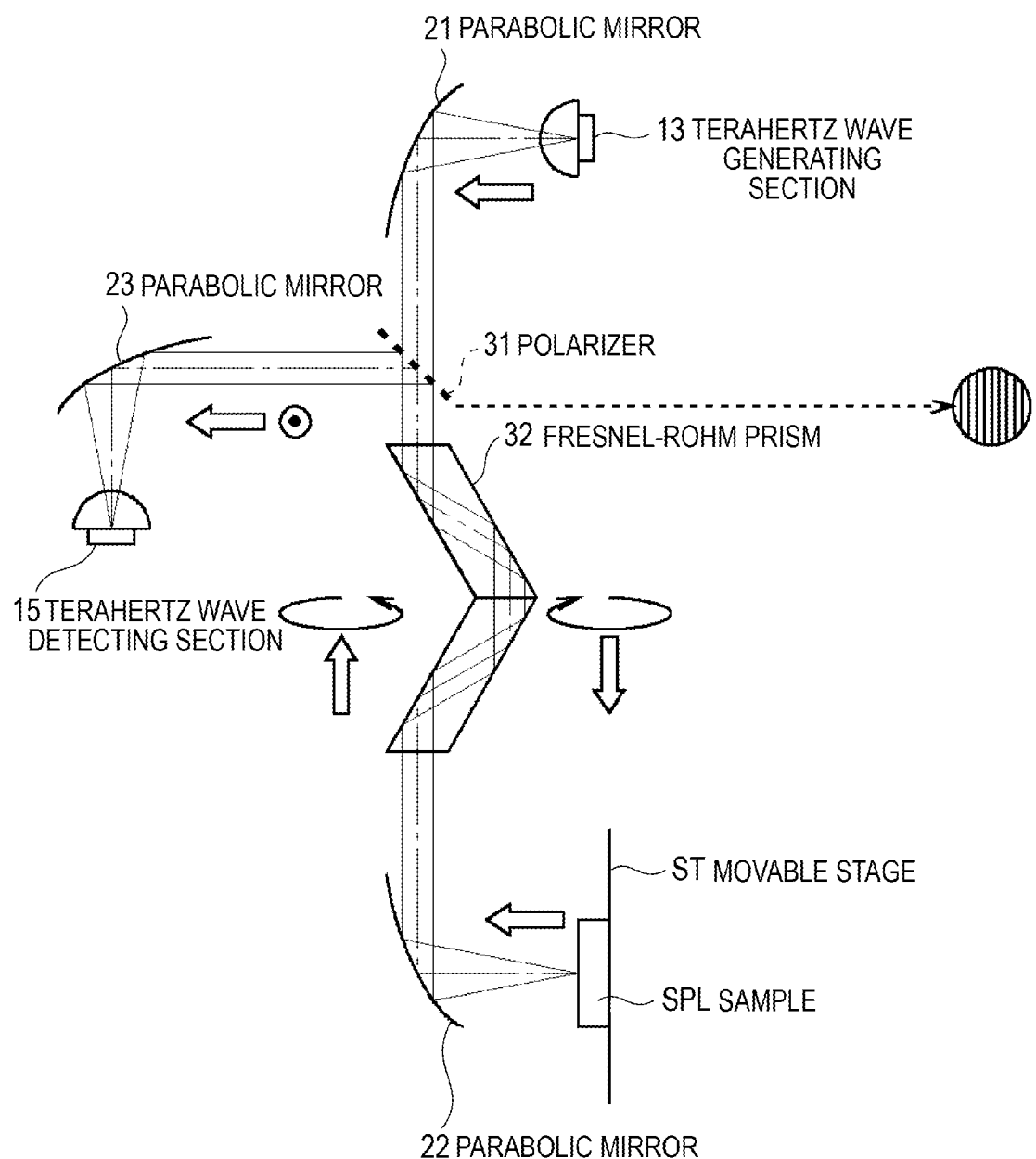
FIG. 2 is a schematic diagram showing a configuration of a terahertz wave propagating optical system.

The Fresnel-Rohm prism 32 is tilted such that total reflection surfaces thereof are at 45° to the direction in the arranging direction of the wires of the polarization beam splitter 31 (the prism is tilted to define an upward angle of 45° to the plane of FIG. 2). Thus, the Fresnel-Rohm prism 32 serves as a quarter wave plate which totally reflects the linearly polarized terahertz wave from the polarization beam splitter 31 four times therein to impart a phase difference of 90° to the same. Therefore, the terahertz wave is transformed into circularly polarized light (or elliptically polarized light that is nearly circularly polarized) when it exits from the Fresnel-Rohm prism 32.

The angle of incidence of light on the total reflection surfaces of the Fresnel-Rohm prism 32 will now be described. Let us assume that $\delta$ represents a phase difference between P-polarized light and S-polarized light; $n_1$ represents the refractive index of air; $n_2$ represents the refractive index of the material of the prism; and $\theta$ represents an angle of incidence on the total reflection surfaces. Then, the following expression holds true.

$$\tan\frac{\delta}{2} = \frac{n_2}{n_1} \frac{\cos\theta\sqrt{\left(\frac{n_1}{n_2}\right)^2 \sin^2\theta - 1}}{\sin^2\theta} \quad (1)$$

Figure 3:
FIG. 3 is a graph for explaining a relationship between phase differences between P-polarized light and S-polarized light and angles of incidence on a total reflection surface of a prism.

FIG. 3 shows a relationship which exists between the phase difference δ and the angle of incidence θ when the refractive indices $n_1$ and $n_2$ are 1 and 1.5, respectively. As apparent from FIG. 3, when a phase difference of 90° is imparted using four times of total reflection, the light from the polarization beam splitter 31 may have an angle of incidence of 42° or 75°.

The parabolic mirror 22 converges the circularly polarized terahertz wave impinging thereon from the Fresnel-Rohm prism 32 on the irradiation surface in a direction perpendicular to the surface, the wave being converged in the focus position of the parabolic surface. A surface, which is the object of measurement, of the sample SPL is positioned in the focus position by the movable stage ST.

After the circularly polarized terahertz wave is reflected by the sample SPL, the rotating direction of the polarization plane of the wave is reversed, and the wave is guided to the Fresnel-Rohm prism 32 by the parabolic mirror 22 as a bundle of parallel beams. The circularly polarized terahertz wave impinging on the Fresnel-Rohm prism 32 as thus described undergoes total reflection in the Fresnel-Rohm prism 32 four times, and a phase difference of 90° is imparted to the same. Thus, the terahertz wave is transformed into linearly polarized light (S-polarized light) that is orthogonal to the polarization direction of the linearly polarized light (P-polarized light) impinging on the Fresnel-Rohm prism 32 from the polarization beam splitter 31. Therefore, the linearly polarized (S-polarized) terahertz wave impinging on the polarization beam splitter 31 from the Fresnel-Rohm prism 32 is reflected by the polarization beam splitter 31 instead of being transmitted, and the wave is guided to the parabolic mirror 23.

The parabolic mirror 23 converges the circularly polarized terahertz wave impinging thereon from the polarization beam splitter 31 on the terahertz wave detecting section 15 disposed in the focus position of the parabolic surface.

As thus described, the terahertz wave propagating optical system TPOS guides the terahertz wave generated by the terahertz wave generating section 13 to the sample SPL and converges the terahertz wave reflected by the sample SPL on the terahertz wave detecting section 15.

(3) Operations and Effects

In the above-described configuration, the terahertz wave propagating optical system TPOS of the terahertz wave spectroscopic apparatus 10 includes the polarization beam splitter 31 which transmits the terahertz wave impinging thereon from the terahertz wave generating section 13 via the parabolic mirror 21, the Fresnel-Rohm prism 32 which imparts a phase difference of 90° to the linearly polarized terahertz wave impinging from the polarization beam splitter 31 to transform it into circularly polarized light, and the parabolic mirror 22 which converges the circularly polarized terahertz wave impinging thereon via the Fresnel-Rohm prism 32 on the irradiation surface (FIG. 2).

Therefore, even when a sample SPL having certain orientation characteristics such as those observed on a fiber-like structure is disposed on the irradiation surface, since the terahertz spectroscopic apparatus 10 converges a circularly polarized terahertz wave on the irradiation surface, the reflectance of the terahertz wave at the sample SPL can be made similar to that observed on a sample SPL having no orientation characteristics. That is, in this terahertz spectroscopic apparatus 10, variation of reflectance can be suppressed regardless of the orientation of a sample SPL, and reproducibility of measurement can be improved accordingly. As a result, improved accuracy of measurement can be achieved.

Since variation of reflectance can be suppressed regardless of the orientation of a sample SPL, the apparatus is advantageous in that it can accommodate samples SPL (objects of measurement) used in various technical fields such as industrial, medical, biological, agricultural, and security-related techniques.

The parabolic mirror 22 of the terahertz spectroscopic apparatus 10 converges a circularly polarized terahertz wave on the irradiation surface and also guides the circularly polarized terahertz wave to the Fresnel-Rohm prism 32 after the wave is reflected by the sample SPL disposed on the irradiation surface. The terahertz wave detecting section 15 detects the terahertz wave impinging thereon after traveling via the Fresnel-Rohm prism 32 and the polarization beam splitter 31 in the order listed as linearly polarized light (S-polarized light) orthogonal to the linearly polarized light (P-polarized light) transmitted through the polarization beam splitter 31 (FIG. 2). That is, the path from the polarization beam splitter 31 to the parabolic mirror 22 is used as a path going to the sample SPL (a path for a wave to impinge on the sample SPL) and a path returning from the sample (an exiting path from the sample SPL).

When the path is used as thus described, the Fresnel-Rohm prism 32 transforms the terahertz wave traveling the path going to the sample (the path for the wave to impinge on the sample SPL) into circularly polarized light and transforms the terahertz wave traveling in the return path (the exiting path from the sample SPL) into linearly polarized light. Since the states of polarization of the terahertz waves in the paths going and returning to and from the sample are thus differentiated from each other, a common terahertz wave propagating path can be used as those paths. Thus, the optical system can be simplified through a reduction in the number of constituent parts thereof.

In addition, since the terahertz wave reflected by the sample SPL is reflected by the polarization beam splitter 31 instead of being transmitted by the same, the wave can be detected by the terahertz wave detecting section 15 without reducing the intensity of the same. For example, according to the above-cited document (the specification of Japanese Patent No. 3550381), a terahertz wave which has traveled through the sample 5 is guided to the reception antenna 7 with its intensity reduced when traveling through the detector 31. Thus, the signal-to-noise ratio (SNR) of the wave is degraded. Therefore, in the terahertz spectroscopic apparatus 10, the terahertz wave reflected by the sample SPL can be detected without loss (without degradation of the signal-to-noise ratio) even though the path from the polarization beam splitter 31 to the parabolic mirror 22 is used as both the paths for going and returning to and from the sample, and the accuracy of measurement can be improved accordingly.

In the terahertz spectroscopic apparatus 10, the terahertz wave converged on the irradiation surface is guided to the irradiation surface in a direction perpendicular to the surface (FIG. 2). When the surface is obliquely irradiated, an analysis of a measurement signal involves calculations performed in consideration to the angle of incidence of the wave on the irradiation surface. When the surface is perpendicularly irradiated, such calculations are not required, and errors attributable to such calculations can therefore be avoided. The accuracy of measurement can be improved accordingly.

Further, perpendicular irradiation is more advantageous than oblique irradiation in that higher resolution can be more easily achieved. In general, a lower limit of resolution is inevitably set by the diffraction limit of light. Rayleigh resolution is given by $0.62 \cdot \lambda / NA$ where λ represents a wavelength and NA represents a numerical aperture of an optical member. For example, let us assume that the optical system for converging light on the terahertz wave detecting section 15 has a numerical aperture of 0.5 and that a terahertz wave of 1 THz is used. Then, since the terahertz wave has a wavelength of 300 µm, Rayleigh resolution of 370 µm is achieved.

In order to achieve higher resolution, the wavelength must be made shorter when the numerical aperture of the optical system is fixed. However, the measurable band becomes more limited in the terahertz band which becomes wider as the wavelength is made shorter. On the contrary, when the wavelength is fixed, the numerical aperture of the optical system must be increased. It is therefore necessary to choose an optical system which has a shorter focal distance and a greater effective diameter, the greater the numerical aperture thereof. In the case of oblique irradiation, angles of incidence on both of an irradiation lens and a light-receiving lens must be very great in order to avoid contact between the two lenses. Therefore, when the terahertz wave spectroscopic apparatus 10 is used as an imaging apparatus, more particularly, a microscope, the use of perpendicular irradiation is more advantageous in that it is possible to avoid such a situation that sufficient resolution cannot be achieved because of limitations on the disposition of lenses.

The Fresnel-Rohm prism 32 of the terahertz spectroscopic apparatus 10 performs phase conversion utilizing four times of total reflection, and the prism is molded from a plastic (organic polymer) such as polyethylene, Teflon (a registered trademark), polymethylpentene, cyclo-olefin polymer, or cyclo-olefin copolymer. Those materials have a small refractive index and low wavelength dependence in a terahertz wave band.

Therefore, in the terahertz spectroscopic apparatus 10, Fresnel reflections at the Fresnel-Rohm prism 32 can be minimized to detect even a wide terahertz band with reflection loss in the terahertz band suppressed. Since a high signal-to-noise ratio can be achieved accordingly, the accuracy of measurement can be improved.

In addition, by using the Fresnel-Rohm prism 32 as a quarter wave plate, the optical axes of incident light and exiting light can be made coaxial. Thus, even when a visually unperceivable terahertz wave is used, the quarter wave plate can be easily positioned in proper orientation. In the terahertz spectroscopic apparatus 10, the polarization beam splitter 31 having visually perceivable wires is used, the quarter wave plate can be easily positioned in proper orientation also in relation to the polarization beam splitter 31.

In the above-described configuration, the Fresnel-Rohm prism 32 having no wavelength dependence is operated as a quarter wave plate to guide a circularly polarized terahertz wave to the irradiation surface in a direction perpendicular to the surface. Thus, a terahertz spectroscopic apparatus 10 capable of measuring a sample SPL with improved accuracy can be provided.

(4) Other Embodiments

In the above-described embodiment is an instance in which a Fresnel-Rohm prism 32 is used as a quarter wave plate. However, the invention is not limited to such an instance, and other optical members may alternatively be used.

For example, it is possible to use a Fresnel-Rohm prism in which total reflection occurs twice to transform linearly polarized light into circularly polarized light or to transform circularly polarized light into linearly polarized light. When such a Fresnel-Rohm prism is used, although the above-description holds true in that the prism is tilted such that a total reflection surface of the same is at 45° to the arranging direction of the wires of the polarizer 31, a change must be made such that the angle of incidence on the total reflection surface of the Fresnel-Rohm prism will be 42° or 74.8°.

For example, it is possible to use an achromatic quarter wave plate obtained by combining six crystal plates having different thicknesses with the crystal orientation of each plates adjusted (J. Masson and G. Gallot: Opt. Lett., Vol. 31, No. 2, 265(2006)). However, the Fresnel-Rohm prism 32 is more advantageous than the achromatic quarter wave plate in that a phase shift of 90° can be easily adjusted.

Figure 4:
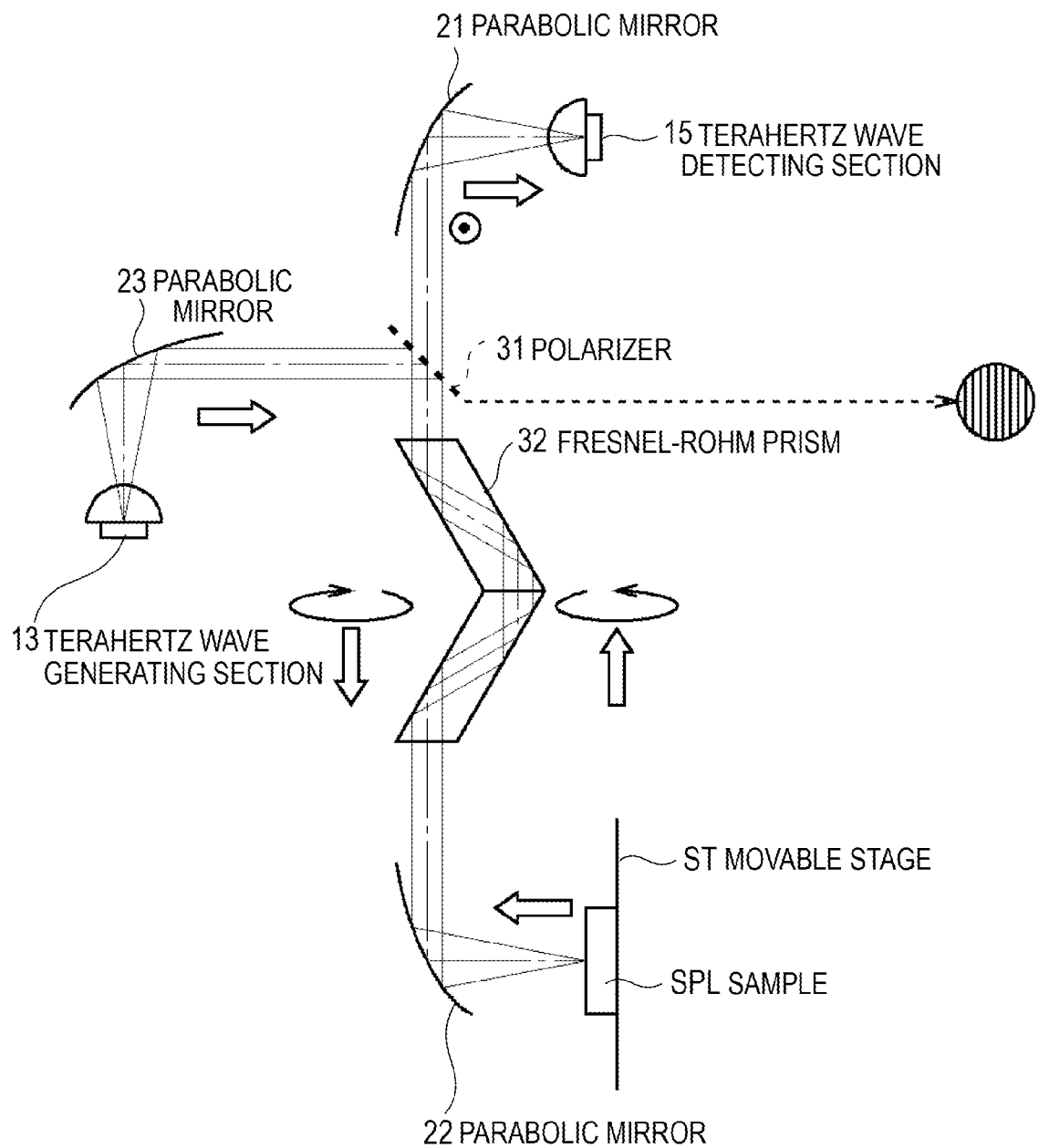
FIG. 4 is a schematic diagram showing a configuration (1) of a terahertz wave propagating optical system according to another embodiment of the invention.

For example, a component called a high resistance silicon prism may be used (Nobuhisa Hiromoto, "Handbook of Terahertz Technology", Chapter 7 Terahertz Measuring System, 7.4.2 Polarization Sensing, issued by NGT on Nov. 29, 2007, p. 462, FIG. 4). Since silicon has more significant reflection loss compared to plastic because it has a higher refractive index, the Fresnel-Rohm prism 32 made of plastic is more appropriate for the purpose of improving the accuracy of measurement.

Reflectance can be simply expressed by $((r-1)/(r+1))^2$ where r represents a refractive index. Since the refractive index of silicon is 3.4, the reflectance of silicon is about 30%. Therefore, when such a prism is used, a reflection loss of about 60% occurs in the paths going and returning to and from the irradiation surface. Let us assume that the Fresnel-Rohm prism 32 has a refractive index of 2. Then, the reflection loss of the prism can be suppressed to 11% or less or 20% or less in terms of the total loss in the going and returning paths, which is lower than the loss of the silicon prism.

Although it has been described above that plastic is used as the material of the Fresnel-Rohm prism 32, various dielectric bodies may be used as long as they are transparent to a terahertz band. Although it is pointed out above that silicon has a high refractive index, the statement does not imply that silicon cannot be used.

The refractive index of the Fresnel-Rohm prism 32 can be decreased to suppress reflection loss by mirror-polishing the total reflection surfaces in the Fresnel-Rohm prism 32. The entrance surface and the exit surface of the Fresnel-Rohm prism 32 may be finished as (moth-eye-like) sandy surfaces having irregularities smaller than the wavelength of a terahertz wave to decrease the refractive index and to suppress reflection loss.

The above embodiment has been described as an instance in which a terahertz wave propagating optical system TPOS transmitting a linearly polarized (P-polarized) terahertz wave and reflecting a linearly polarized (S-polarized) terahertz wave guided thereto after traveling back and forth through the Fresnel-Rohm prism 32 is constructed. The invention is not limited to such an instance, and the terahertz wave propagating optical system TPOS may be constructed to reflect a linearly polarized (S-polarized) terahertz wave and to transmit a linearly polarized (P-polarized) terahertz wave guided thereto after traveling back and forth through the Fresnel-Rohm prism 32.

In such a configuration, as illustrated in FIG. 4 in which elements corresponding to elements in FIG. 2 are indicated by like reference numerals, the terahertz wave generating section 13 and the terahertz wave detecting section 15 may be replaced with each other, and the prism may be tilted such that the total reflection surface is at −45° to the arranging direction of the wires of the polarization beam splitter 31 (the prism may be tilted downward at 45° to the plane of FIG. 4). Then, the same advantages as those of the above-described embodiment can be achieved.

The above-described embodiment has been described as an instance in which a terahertz wave propagating optical system TPOS is constructed using parabolic mirrors 21 to 23. The invention is not limited to such an instance, and the terahertz wave propagating optical system TPOS may be constructed using optical lenses.

Figure 5:
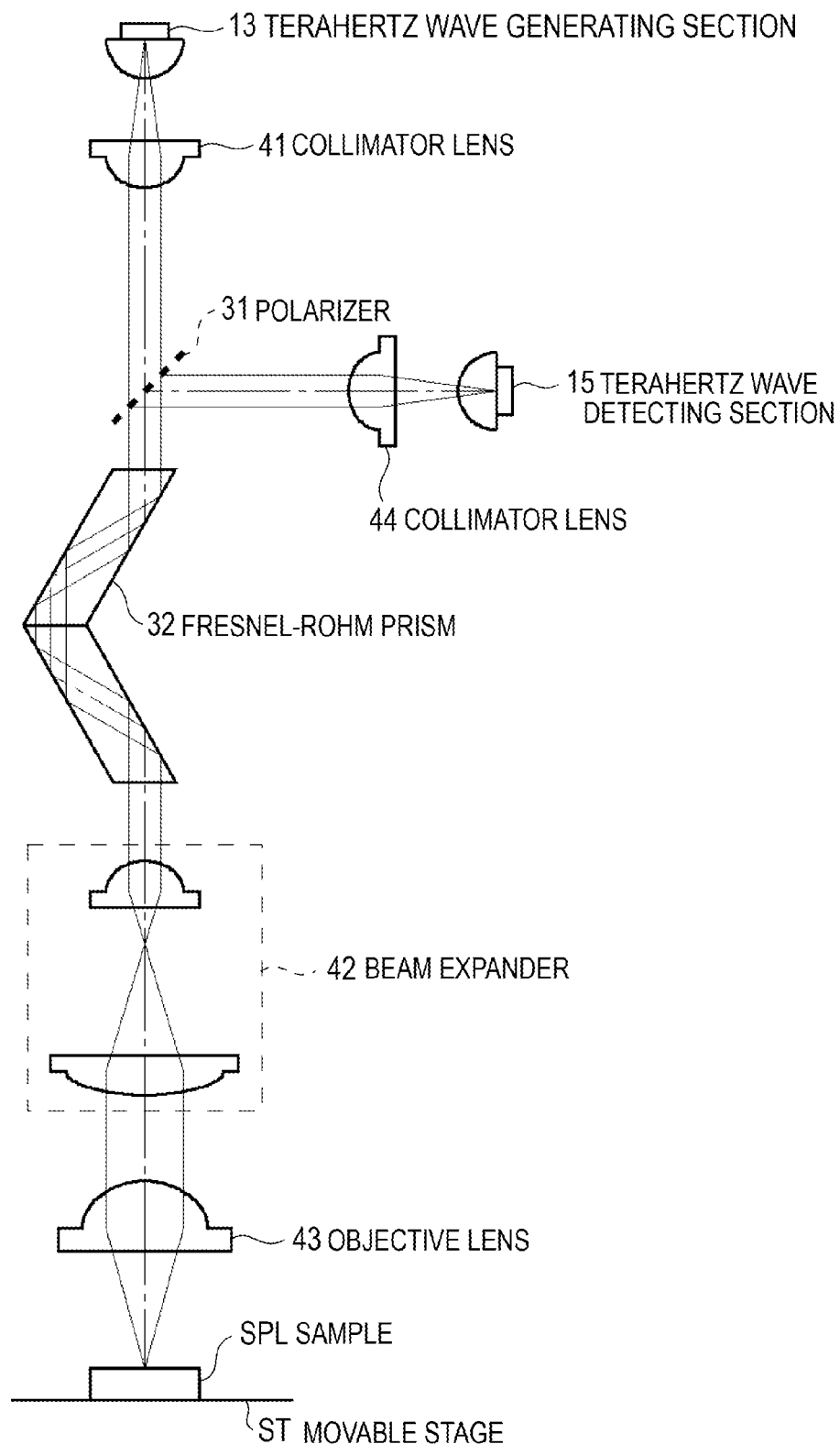
FIG. 5 is a schematic diagram showing a configuration (2) of a terahertz wave propagating optical system according to another embodiment of the invention.

For example, a terahertz wave propagating optical system may be constructed as shown in FIG. 5 in which elements corresponding to elements in FIG. 2 are indicated by like reference numerals. The terahertz wave propagating optical system shown in FIG. 5 is different in that collimator lenses 41 and 44 are used instead of the parabolic mirrors 21 and 23 (FIG. 2) and in that a beam expander 42 and an objective lens 43 are used instead of the parabolic mirror 22. Since this terahertz wave propagating optical system employs lenses, the optical adjustment of the optical system can be carried out more easily compared to the terahertz wave propagating optical system TPOS shown in FIG. 2.

Further, the above-embodiment has been described as an instance in which the time of arrival of the probe light at the terahertz wave detecting section 15 is delayed by changing the optical path length between the polarization beam splitter 12 and the terahertz wave detecting section 15. The invention is not limited to such an instance, and the delay may be provided by changing the optical path length between the polarization beam splitter 12 and the terahertz wave generating section 13. That is, the time of arrival of the probe light at the terahertz wave detecting section 15 can be delayed where the optical path length between the polarization beam splitter 12 and the terahertz wave generating section 13 and the optical path length between the polarization beam splitter 12 and the terahertz wave detecting section 15 can be changed relative to each other.

The invention can be used for industrial, medical, biological, agricultural, and security purposes or industries such as telecommunication and electronics.

The present application contains subject matter related to that disclosed in Japanese Priority Patent Application JP 2008-152046 filed in the Japan Patent Office on Jun. 10, 2008, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A terahertz spectroscopic apparatus comprising:
    a polarization beam splitter receiving from a light source a linear-polarized terahertz wave and transmitting or reflecting the linearly-polarized terahertz wave;
    a quarter wave plate imparting a phase difference of 90° to the terahertz wave impinging thereon from the beam splitter and producing a circularly-polarized terahertz wave; and
    an optical member guiding to an irradiation surface the circularly-polarized terahertz wave impinging thereon from the quarter wave plate.

2. A terahertz spectroscopic apparatus according to claim 1, wherein
    the optical member further guides to the quarter wave plate the circularly-polarized terahertz wave after the circularly-polarized terahertz wave is reflected by a sample disposed on the irradiation surface, and
    the apparatus further comprises a detecting section detecting a second terahertz wave produced by a light source and propagated through the polarization beam splitter, the quarter wave plate and the optical member, the second terahertz wave being linearly-polarized light that is orthogonal to linearly-polarized light of the terahertz wave impinging on the quarter wave plate from the polarization beam splitter.

3. A terahertz wave spectroscopic apparatus according to claim 2, wherein the optical member guides to the irradiation surface in a direction perpendicular to the irradiation surface the circularly-polarized terahertz wave impinging from the quarter wave plate.

4. A terahertz spectroscopic apparatus according to claim 2, wherein the quarter wave plate is a Fresnel-Rohm prism utilizing total reflection which is tilted such that a total reflection surface thereof is at an angle 45° or −45° to the polarization plane of the linearly-polarized light of the terahertz wave impinging on the quarter wave plate from the polarization beam splitter.

5. A terahertz spectroscopic apparatus according to claim 4, wherein:
    the polarization beam splitter is a sheet on which a plurality of wires are arranged in a same direction at predetermined intervals; and
    the Fresnel-Rohm prism is tilted such that the total reflection surface thereof is at an angle 45° or −45° to the arranging direction of the plurality of wires.

6. A terahertz spectroscopic apparatus according to claim 4, wherein the Fresnel-Rohm prism causes total reflection four times in the Fresnel-Rohm prism.

7. A terahertz spectroscopic apparatus according to claim 4, wherein the Fresnel-Rohm prism is a dielectric body transparent to a terahertz wave band.

8. A terahertz spectroscopic apparatus according to claim 4, wherein the total reflection surface in the Fresnel-Rohm prism is mirror-polished, and an entrance surface and exit surface of the Fresnel-Rohm prism are sandy surfaces.

* * * * *